US009654659B2

(12) United States Patent
Hikichi (10) Patent No.: US 9,654,659 B2
(45) Date of Patent: May 16, 2017

(54) IMAGE FORMING APPARATUS, METHOD FOR CONTROLLING THE SAME, RECORDING MEDIUM, AND IMAGE FORMING SYSTEM FOR CHANGING A POWER STATE OF AT LEAST ONE OF AN IMAGE FORMING APPARATUS AND A POST-PROCESSING APPARATUS

(71) Applicant: CANON KABUSHIKI KAISHA, Tokyo (JP)

(72) Inventor: Atsushi Hikichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/915,884

(22) Filed: Jun. 12, 2013

(65) Prior Publication Data

US 2013/0342863 A1 Dec. 26, 2013

(30) Foreign Application Priority Data

Jun. 26, 2012 (JP) ................................. 2012-143140

(51) Int. Cl.
*G06K 15/00* (2006.01)
*H04N 1/00* (2006.01)

(52) U.S. Cl.
CPC ..... *H04N 1/00891* (2013.01); *H04N 1/00901* (2013.01); *H04N 1/00904* (2013.01); *H04N 1/00928* (2013.01); *H04N 2201/0094* (2013.01)

(58) Field of Classification Search
CPC ....... H04N 1/00891; H04N 1/36; G05B 11/01
See application file for complete search history.

(56) References Cited

U.S. PATENT DOCUMENTS

| 7,982,889 | B2 * | 7/2011 | Okada ................ G03G 15/5004 358/1.1 |
| 2002/0134268 | A1 * | 9/2002 | Yamada ........................ 101/484 |
| 2005/0135830 | A1 * | 6/2005 | Koyama ............ G03G 15/5004 399/88 |
| 2005/0179935 | A1 | 8/2005 | Ogura et al. |
| 2006/0100724 | A1 * | 5/2006 | Miura et al. .................... 700/82 |

(Continued)

FOREIGN PATENT DOCUMENTS

| CN | 101013286 A | 8/2007 |
| JP | H5-162421 A | 6/1993 |

(Continued)

*Primary Examiner* — Henok A Shiferaw
(74) *Attorney, Agent, or Firm* — Canon USA, Inc. I.P. Division (57) ABSTRACT

An image forming apparatus capable of communicating with the post-processing apparatus. The image forming apparatus includes an execution unit configured to execute a shift processing for shifting the image forming apparatus into a power saving state, a notification unit configured to notify the post-processing apparatus of an instruction to stop supply of power to the post-processing apparatus, and a power control unit configured to control the supply of power to the execution unit. The notification unit is configured, if the supply of power to the notification unit is stopped in a case where the execution unit is executing the shift processing, to control so that power is supplied to the notification unit. The notification unit supplied with power notifies the post-processing apparatus of the instruction.

18 Claims, 9 Drawing Sheets

(56) References Cited

U.S. PATENT DOCUMENTS

| | | | |
|---|---|---|---|
| 2007/0047998 A1* | 3/2007 | Watanabe | G03G 15/5004 |
| | | | 399/88 |
| 2007/0183107 A1 | 8/2007 | Okada | |
| 2008/0158616 A1* | 7/2008 | Kudo | 358/424 |
| 2011/0235083 A1 | 9/2011 | Suzuki | |
| 2012/0044530 A1* | 2/2012 | Kato | B41J 3/44 |
| | | | 358/1.15 |
| 2012/0084585 A1 | 4/2012 | Yokoyama | |

FOREIGN PATENT DOCUMENTS

| | | |
|---|---|---|
| JP | H8-238822 A | 9/1996 |
| JP | 2007-065209 A | 3/2007 |
| JP | 2007-090527 A | 4/2007 |
| JP | 2010-113201 A | 5/2010 |
| KR | 10-2012-0055103 A | 5/2012 |

* cited by examiner

IMAGE FORMING APPARATUS, METHOD FOR CONTROLLING THE SAME, RECORDING MEDIUM, AND IMAGE FORMING SYSTEM FOR CHANGING A POWER STATE OF AT LEAST ONE OF AN IMAGE FORMING APPARATUS AND A POST-PROCESSING APPARATUS

BACKGROUND OF THE INVENTION

Field of the Invention

The present invention relates to an image forming apparatus, a method for controlling the same, a recording medium, and an image forming system.

Description of the Related Art

In recent years, a shutdown function for flexibly turning off the power state of an image forming apparatus has been proposed as the demand for a power saving of appliances has increased. As examples of the shutdown function, there are an auto shutdown function, a weekly shutdown function, and a remote shutdown function.

The auto shutdown function is to start a timer when an image forming apparatus is brought into a sleep state and maintain the sleep state. The timer is stopped when a predetermined period of time elapses to automatically turn off the image forming apparatus.

The weekly shutdown function is to previously set a day of the week and the image forming apparatus is automatically turned off when the time counted by a timer of the image forming apparatus reaches the set time.

Further, by the remote shutdown function, the image forming apparatus is remotely turned off by an external apparatus using a Management Information Base (MIB) of a Simple Mail Transfer Protocol (SMPT) or a unique application programming interface (API).

The image forming apparatus is turned off by the above shutdown function to enable power saving of the image forming apparatus. On the other hand, there is a demand for the power saving of the image forming apparatus even in the case where the image forming apparatus is not in an off-state. A technique to save the power of the image forming apparatus has been known, by which power is supplied to a device only when the device is used, in the case where the image forming apparatus is not in the off-state (refer to Japanese Patent Application Laid-Open Nos. 5-162421 and 8-238822). In the image forming apparatus discussed in Japanese Patent Application Laid-Open Nos. 5-162421 and 8-238822, a printer is energized (powered) only when a print function is used and the printer is not energized (powered) when the print function is not used.

The image forming apparatus can be connected to a post-processing apparatus for discharging, sorting, stapling, punching, and cutting a paper output from the image forming apparatus. In general, the image forming apparatus and the post-processing apparatus use their respective power supplies different from each other. More specifically, a switch for shutting down a controller unit mounted on the image forming apparatus (hereinafter referred to as a main body controller), a scanner unit, a printer unit, a FAX unit, various boards and chips, and the image forming apparatus use a power supply different from a switch for shutting down a controller unit mounted on a finisher apparatus (hereinafter referred to as a finisher controller) and shutting down the finisher controller. Therefore, both switches for the image forming apparatus and the finisher apparatus need to be turned off to shut down both the image forming apparatus and the finisher apparatus by the above shutdown function.

In a printing system equipped with the image forming apparatus and the finisher apparatus connected to the image forming apparatus, the finisher apparatus is communicably connected to a printer unit to handle the paper printed by the printer unit of the image forming apparatus. For this reason, the image forming apparatus communicates with the finisher apparatus via the printer unit. For this reason, if the shutdown function is to be executed, the main body controller of the image forming apparatus notifies the finisher controller of an operation end via the printer unit.

However, as discussed in Japanese Patent Application Laid-Open Nos. 5-162421 and 8-238822, the printer unit through which an end notification between the main body controller and the finisher controller goes is not always constantly supplied with power. If the supply of power to the printer unit is stopped, the image forming apparatus cannot send an end notification to the finisher apparatus. As a result, the finisher controller for turning off the finisher apparatus in response to the reception of the end notification cannot receive the notification because the supply of power to the printer unit is stopped, so that the finisher controller cannot turn off the finisher apparatus.

Even in a case where the supply of power not only to the above printer but also to pathway devices between the main body controller and the finisher controller is stopped, the image forming apparatus cannot send the end notification to a post-processing apparatus. As a result, the finisher apparatus cannot execute the shutdown function, so that the finisher apparatus cannot be turned off.

SUMMARY OF THE INVENTION

The present invention is directed to the image forming apparatus which sends an end notification to a post-processing apparatus by supplying power to a pathway device which is a path for the end notification in a case where the image forming apparatus notifies the post-processing apparatus of the end processing.

According to an aspect of the present invention, an image forming apparatus capable of communicating with a post-processing apparatus includes an execution unit configured to execute a shift processing for shifting the image forming apparatus into a power saving state, a notification unit configured to notify the post-processing apparatus of an instruction to stop supply of power to the post-processing apparatus, and a power supply control unit configured to control supply of power to the execution unit and the notification unit. If the supply of power to the notification unit is stopped in a case where the execution unit executes the shift processing, the power supply control unit is configured to control so that power is supplied to the notification unit and the notification unit supplied with power by the power supply control unit notifies the post-processing apparatus of the instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

[General Configuration of Image Forming System]

Figure 1:
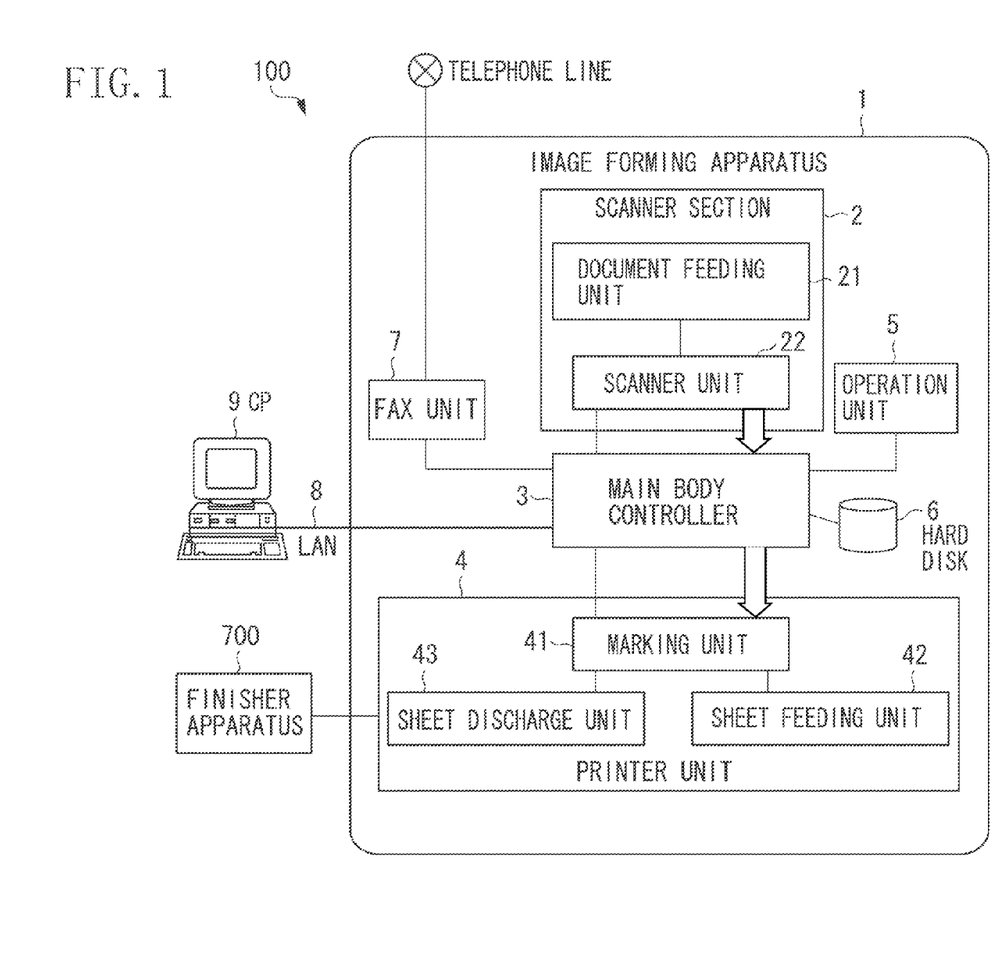
FIG. 1 is a block diagram illustrating a general configuration of an image forming system.

FIG. 1 is a block diagram illustrating a general configuration of an image forming system.

An image forming system 100 includes an image forming apparatus 1 and a finisher apparatus (a post-processing apparatus) 700 connected to the image forming apparatus 1. The image forming apparatus 1 forms an image on a sheet. The sheet on which an image is formed by the image forming apparatus 1 is received by the finisher apparatus 700. The finisher apparatus 700 applies post processing (stapling, punching, and others) to the sheet received by the image forming apparatus 1. The image forming apparatus 1 of the image forming apparatus 100 is connected to a personal computer (PC) 9 via a local area network (LAN) 8. The image forming apparatus 1 is communicably connected to the finisher apparatus 700.

The image forming apparatus 1 includes a scanner unit 2, a printer unit 4, an operation unit 5, a hard disk 6, a facsimile (FAX) unit 7, and a main body controller 3.

The scanner unit 2 reads a document and outputs image data. The scanner unit 2 includes a document feeding unit 21 and a scanner unit 22. The document feeding unit 21 conveys the document. The scanner unit 22 optically reads the conveyed document and converts the read data into image data as an electric signal.

The printer unit 4 prints on the sheet based on the image data. The printer unit 4 includes a sheet feeding unit 42, a marking unit 41, and a sheet discharge unit 43. The sheet feeding unit 42 includes a sheet cassette with a plurality of stages storing recording paper. The marking unit 41 transfers the image data to the recording paper and fixes the image data onto the recording paper. The sheet discharge unit 43 outputs the printed recording paper to the finisher apparatus 700. The conveyance of the paper by the printer 4 needs to be synchronized with that of the paper by the finisher apparatus 700 to convey the paper printed by the printer 4 to the finisher apparatus 700. For this reason, the printer 4 of the image forming apparatus 1 is connected to the finisher apparatus 700.

The operation unit 5 includes various keys and a panel. The operation unit 5 receives various instructions from a user via the various keys. The operation unit 5 displays various information via the panel.

The hard disk 6 stores control programs and image data.

The FAX unit 7 performs input/output processing via a telephone line.

The main body controller 3 is connected to the above configuration blocks such as the scanner unit 2, the printer unit 4, the operation unit 5, the hard disk 6, and the FAX unit 7 to controls the configuration blocks.

The finisher apparatus 700 subjects the recording paper output from the sheet discharge unit 43 of the printer unit 4 to processing such as discharging, sorting, stapling, punching, and cutting.

The image forming apparatus 1 of the present exemplary embodiment is a multifunction peripheral in which the scanner unit 2, the printer unit 4, and the FAX unit 7 can execute a plurality of functions. The functions which can be executed by the image forming apparatus 1 are exemplified below.

Copy Function: The image data of the document read by the scanner unit 2 are stored in the hard disk 6 and the printer unit 4 prints on the paper based on the image data.

SEND Function: The image data of the document read by the scanner unit 2 are transmitted to the PC 9 via the LAN 8.

BOX Function: The image data of the document read by the scanner unit 2 are stored in the hard disk 6. The image data transmitted from the PC 9 are stored in the hard disk 6.

Print Function: Page description language (PDL) data transmitted from the PC 9 are interpreted and printed by the printer unit 4.

[Configuration of Main Body Controller 3]

Figure 2:
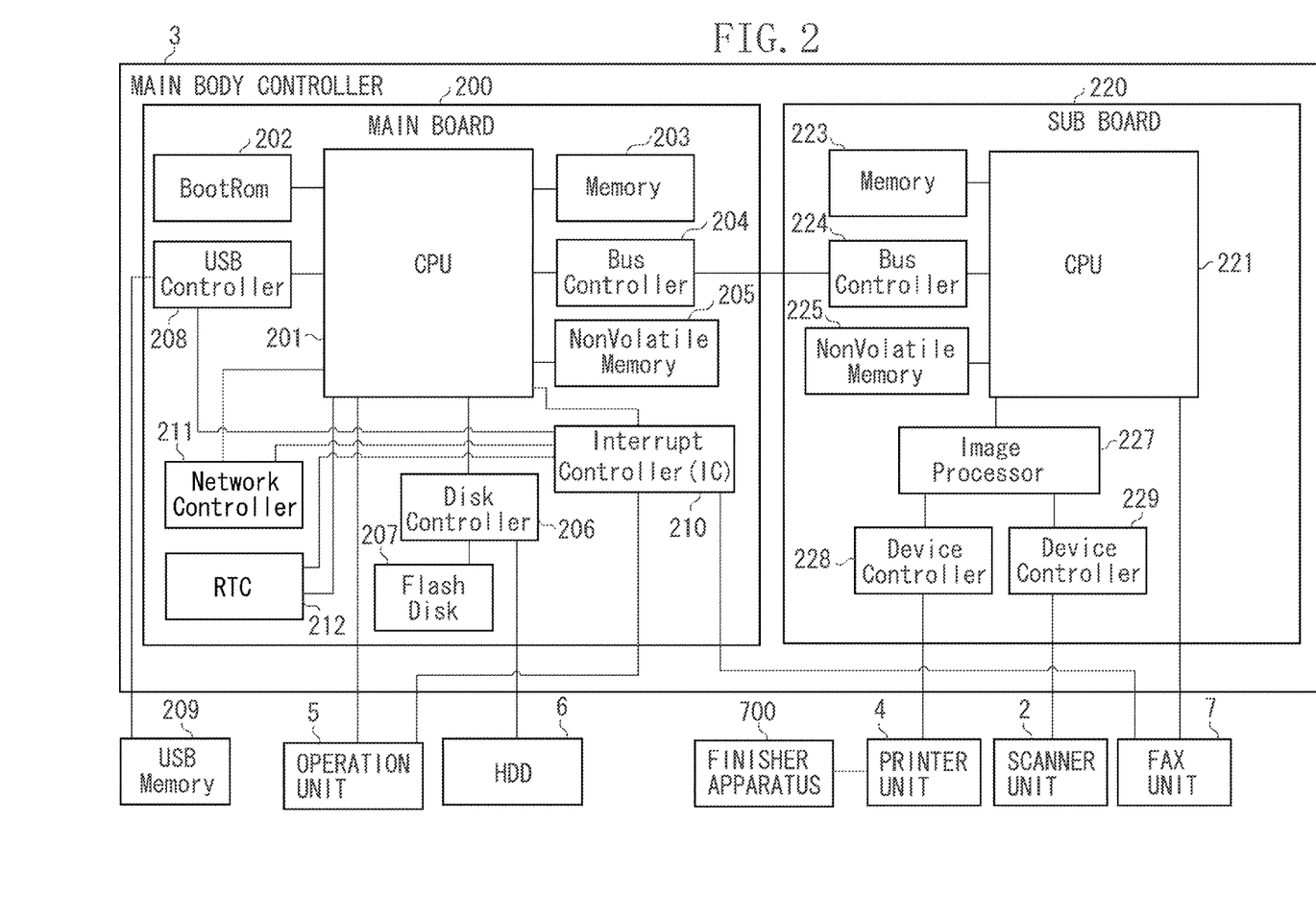
FIG. 2 is a block diagram illustrating a configuration of a main body controller of an image forming apparatus.

FIG. 2 is a block diagram illustrating a configuration of the main body controller 3.

The main body controller 3 includes a main board 200 performing general information processing and a sub-board 220 performing image forming processing. The main board 200 and the sub-board 220 may be formed as one board.

The main board 200 includes a central processing unit (CPU) 201, a BootRom 202, a memory 203, a bus controller 204, a nonvolatile memory 205, a disk controller 206, a flash disk 207, a universal serial bus (USB) controller 208, an interrupt controller 210, a network controller 211, and a real time clock (hereinafter referred to as RTC 212. The BootRom 202 is a nonvolatile storage memory and stores a boot program. The CPU 201 executes the boot program, an operating system (OS), and an application program. The memory 203 is used as a work memory of the CPU 201. The bus controller 204 has a bridge function with the sub-board 220 and performs control to communicate data with the sub-board 220. The disk controller 206 controls the hard disk 6 and the flash disk 207. The flash disk 207 is a comparatively small-capacity storage apparatus (a solid state disk (SSD), for example) formed of a semiconductor device. The USB controller 208 controls a USB memory 209. The interrupt controller 210 performs interrupt processing according to the key operation of the operation unit 5 and the reception of facsimile by the FAX unit 7. The network controller 211 controls communication with the PC 9. The RTC 212 is supplied with power from a battery and counts a current time. The main board 200 is connected to the USB memory 209, the operation unit 5 and the hard disk 6.

The sub-board 220 includes a CPU 221, a memory 223, a bus controller 224, a nonvolatile memory 225, an image processing processor 227, a device controller 228, and a device controller 229. The CPU 221 executes a boot program, an OS, and an application program. The memory 223 is used as a work memory of the CPU 221. The bus controller 224 has a bridge function with the main board 200 and performs control to communicate data with the main board 200. The image processing processor 227 subjects image data to various image processing. The image processing processor 227 performs a real-time digital image processing. The image processing processor 227 communicates digital image data with the printer unit 4 via the device controller 228. The image processing processor 227 communicates digital image data with the scanner unit 2 via the device controller 229. The FAX unit 7 is connected to the CPU 221 which controls the FAX unit 7. The finisher apparatus 700 applies the post processing to the printed paper output from the printer unit 4.

The block diagram in FIG. 2 is a simplified drawing. Actually, however, the CPUs 201 and 221 include a large number of hardware components in the vicinity of the CPUs such as a chip set, a bus bridge, and a clock generator.

The operation of the abovementioned copy function is described below with reference to the blocks in FIG. 2.

When the user issues instructions for copying via the operation unit 5, the CPU 201 transmits a command for reading the set document to the scanner unit 2 via the CPU 221. The scanner unit 2 which receives the command for reading optically scans the set document to convert the scanned data into digital image data. The digital image data are input to the image processing processor 227 via the device controller 229. The image processing processor 227 performs a direct memory access (DMA) transfer to temporarily store the digital image data into the memory 223 via the CPU 221. When the CPU 201 confirms that a certain amount or all of the digital image data are input to the memory 223, the CPU 201 transmits an image output command to the printer unit 4 via the CPU 221. The CPU 221 notifies the image processing processor 227 of the position of the digital image data in the memory 223. The digital image data in the memory 223 is transmitted to the printer unit 4 via the image processing processor 227 and the device controller 228 according to a synchronizing signal from the printer unit 4. The printer unit 4 which receives the digital image data prints an image on the paper based on the digital image data. If a plurality of prints is made, the CPU 201 stores the digital image data of the memory 223 into the hard disk 6 and transmits the digital image data stored in the hard disk 6 to the printer unit 4 to perform the second and the subsequent prints.

[Power State of Main Body Controller in Sleep State]

Figure 3:
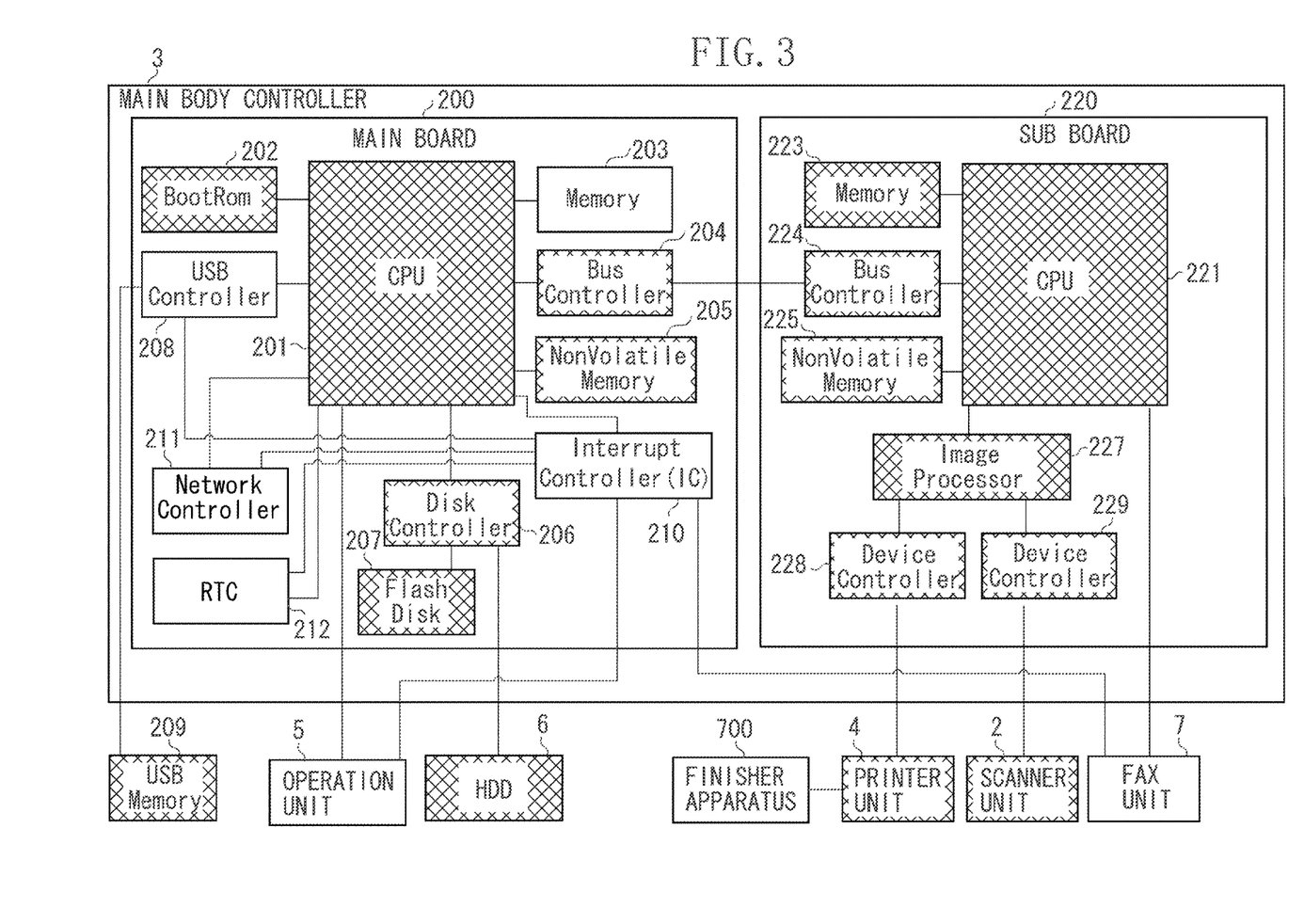
FIG. 3 is a block diagram illustrating a power state of the main body controller in the sleep state of the image forming apparatus.

FIG. 3 is a block diagram illustrating a power state of the main body controller 3 in the sleep state of the image forming apparatus 1. Power supply to the shaded blocks in FIG. 3 is stopped in the sleep state described below. The power state of the image forming apparatus 1 takes any one of an IDLE state in which the copy function and the SEND function can be immediately executed, a sleep state which is smaller in power consumption than the IDLE state, and an off-state (power saving state) in which the supply of power to each block of the image forming apparatus 1 is shut off. The power state of the image forming apparatus 1 is not limited to the above IDLE state, the Sleep state, and the off-state.

The term "IDLE state" refers to a state in which power is supplied to each unit of the image forming apparatus 1 and the above various functions (such as the copy function, the SEND function, the BOX function, and the print function) can be immediately executed.

The term "Sleep state" refers to a state in which the image forming apparatus 1 operates with power consumption smaller than that in the IDLE state. The starting time of the image forming apparatus 1 required for shifting from the sleep state to the IDLE state is shorter than that for shifting from the off-state to the IDLE state. If the image forming apparatus 1 is in the IDLE state and receives not print data from the PC 9 for a certain period of time or the user does not operate the operation unit 5 for a certain period of time, the image forming apparatus 1 shifts from the IDLE state to the sleep state. The condition under which the image forming apparatus 1 shifts to the sleep state is not limited to the above condition. For example, the image forming apparatus 1 may shift from the IDLE state to the sleep state by the user operating a sleep shift key provided on the operation unit 5.

As illustrated in FIG. 3, if the image forming apparatus 1 is in the sleep state, power is supplied to only the required places of the main body controller 3. More specifically, in the sleep state, power is supplied to the memory 203, the USB controller 208, the network controller 211, and the interrupt controller 210 of the main board 200 of the main body controller 3. Further, in the sleep state, power is supplied to the operation unit 5 and the FAX unit 7. The RTC 212 is backed up by a battery that is a power supply different from an alternating current (AC) power supply 304.

In the sleep state, the interrupt controller 210 receives interrupt from the network controller 211 due to the reception of a signal from the network, interrupt from the RTC due to timeout of the RTC 212, interrupt from the FAX unit 7 due to the reception of facsimile, interrupt from the operation unit 5 due to the key operation of the operation unit 5, and interrupt from the USB controller 208 due to attachment and detachment of the USB device and communication. If the interrupt controller 210 receives the above interrupt, the interrupt controller 210 requests a below mentioned power supply unit 500 to start the CPU 201. The CPU 201 supplied with power from the power supply unit 500 performs processing for returning the state of software to the IDLE state.

[Configuration of Power Supply of Image Forming System]

Figure 4:
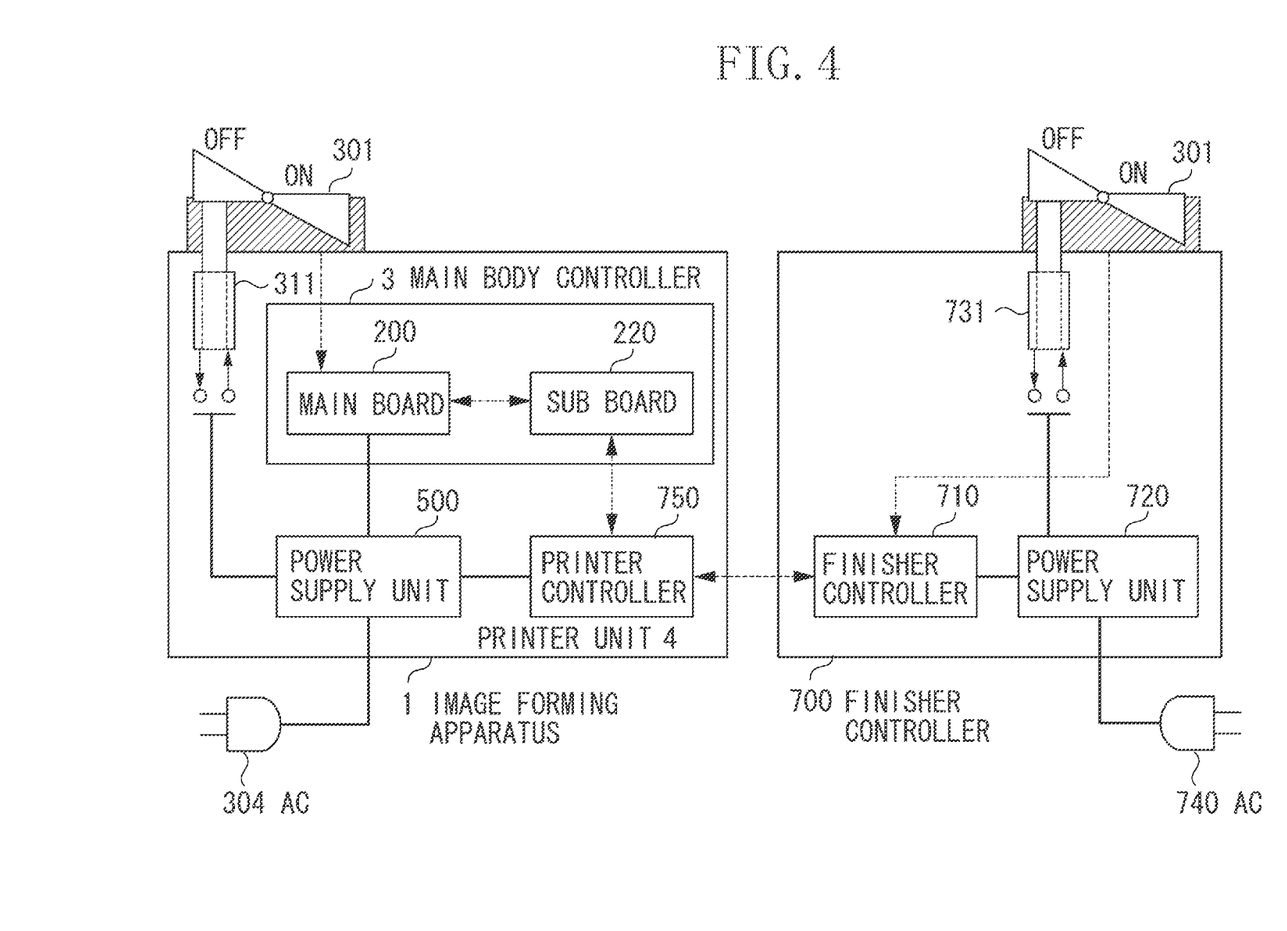
FIG. 4 is a block diagram illustrating the configuration of a power supply of the image forming system.

FIG. 4 is a block diagram illustrating the configuration of power supply for the image forming system 100. The configuration of power supply for the image forming system 100 is described below with reference to FIG. 4.

The power supply unit 500 of the image forming apparatus 1 converts an AC power supply supplied from the AC power supply 304 into a direct current (DC) power supply. The detailed configuration of the power supply unit 500 is described below. The power supply unit 500 supplies DC power to the scanner unit 2, the main body controller 3, the printer unit 4, and a solenoid 311 for turning off a mechanical seesaw switch 301 which is turned on/off according to the user's operation. The seesaw switch 301 is a toggle switch and can mechanically maintain any one of an on-state or off-state. The power supply unit 500 supplies power to the solenoid 311 to drive the solenoid 311. Thereby, the seesaw switch 301 is pulled by the solenoid 311 to turn the seesaw switch 301 off. This turns off the image forming apparatus 1.

A printer controller 750 of the printer unit 4 is a general CPU system such as a CPU, a memory, and a nonvolatile memory which are not illustrated.

A power supply unit 720 of the finisher apparatus 700 converts an AC power supplied from an AC power supply 740 different from the AC power supply 304 of the image forming apparatus 1 into a DC power. The power supply unit 720 supplies the DC power to a solenoid 731 for turning off a mechanical seesaw switch 730 which is turned on/off according to the user's operation and a finisher controller 710. The seesaw switch 730 is a toggle switch and can mechanically maintain one of the on-state or off-state. The power supply unit 720 supplies power to the solenoid 731 to drive the solenoid 731 in turning off the finisher apparatus 700. Thereby, the seesaw switch 730 is pulled by the solenoid 731 to turn the seesaw switch 730 off. This turns off the finisher apparatus 700. The finisher controller 710 is a general CPU system such as a CPU, a memory, and a nonvolatile memory which are not illustrated. The image forming apparatus 1 communicates with the finisher apparatus 700 via the printer controller 750 and finisher controller 710.

[Detailed Configuration of Power Supply of Image Forming Apparatus]

Figure 5:
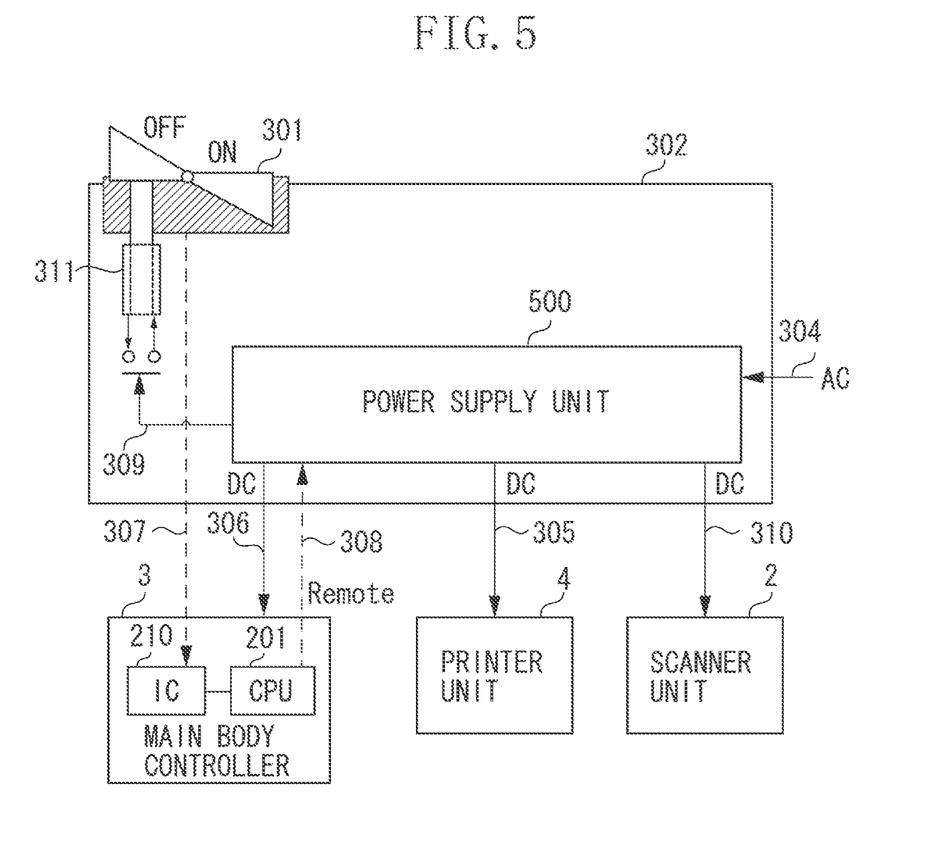
FIG. 5 is a block diagram illustrating the configuration of the power supply of the image forming apparatus.

FIG. 5 is a block diagram illustrating the detailed configuration of power supply for the image forming apparatus 1. The detailed configuration of power supply for the image forming apparatus 1 is described below with reference to FIG. 5.

The image forming apparatus 1 is equipped with the power supply unit 500 for converting the AC power supply of the AC power supply 304 into the DC power supply to supply the DC power to each unit. The power supply unit 500 is connected to the solenoid 311 via a power supply cable 309. The power supply unit 500 supplies power to the solenoid 311 via the power supply cable 309 to drive the solenoid 311. The supply of power to the solenoid 311 drives the solenoid 311, turning off the seesaw switch 301.

The power supply unit 500 supplies power to the scanner unit 2 via a power supply cable 310. The power supply unit 500 supplies power to the printer unit 4 via a power supply cable 305. The power supply unit 500 supplies power to the main body controller 3 via a power supply cable 306.

A line 307 for notifying the interrupt controller 210 of the state of the seesaw switch 301 (on- or off-state) is provided between the seesaw switch 301 and the interrupt controller 210. A signal line 308 through which a power supply remote signal is transmitted from a general purpose input/output (GPIO) included in the CPU 201 is provided between the CPU 201 and the power supply unit 500. The power supply remote signal is used to perform software control of the output of the power supply unit 500. Even in a state where the supply of power to the CPU 201 is stopped, the power supply unit 500 can be notified of the state of the seesaw switch 301 transmitted from the interrupt controller 210 via the GPIO.

The user can turn off the image forming apparatus 1 by operating the seesaw switch 301. When the user operates the seesaw switch 301 to turn off the image forming apparatus 1, the interrupt controller 210 notifies the power supply unit 500 of the state of the seesaw switch 301 via the GPIO of the CPU 201. At this point, if the supply of power to the CPU 201 is being stopped, the power supply unit 500 supplies power to the CPU 201. The CPU 201 supplied with power executes end processing (first shift processing). When the end processing is completed, the power supply remote signal is transmitted to the power supply unit 500 via the signal line 308. Thereby, the power supply unit 500 receiving the power supply remote signal stops supplying power to the main body controller 3. This turns off the image forming apparatus 1. The use of an aftermentioned shutdown function can turn off the image forming apparatus 1 without the user operating the seesaw switch 301. If a factor for executing the shutdown function appears, the CPU 201 executes the end processing of the image forming apparatus 1. If the end processing is completed, the CPU 201 transmits the power supply remote signal to the power supply unit 500 via the signal line 308. The power supply unit 500 receiving the power supply remote signal stops supplying power to the main body controller 3. Furthermore, the power supply unit 500 receiving the power supply remote signal supplies power to the solenoid 311 via the power supply cable 309. As a result, the solenoid is driven to turn off the seesaw switch 301.

[Shutdown Function]

The shutdown function executed by the image forming system 100 of the present exemplary embodiment is described below.

The image forming system 100 executes the auto shutdown function, the weekly shutdown function, and the remote shutdown function.

The auto shutdown function executes the end processing (the first shift processing) when the image forming system 100 is not continuously operated for a predetermined period of time (shifting factor). When the image forming system 100 ends operation, the CPU 201 sets a shutdown shift time (of three hours, for example) to the RTC 212. The RTC 212 counts the shutdown shift time and then executes the end processing.

The weekly shutdown function executes the end processing (the first shift processing) when a previously set specified time is reached. The CPU 201 sets the weekly shutdown time to the RTC 212 (for example, Monday 17:00, Tuesday 17:00, Wednesday 17:00, Thursday 17:00, and Friday 17:00). When the time counted by the RTC 212 reaches the weekly shutdown time, the CPU 201 executes the end processing.

The remote shutdown function executes the end processing (the first shift processing) when an external apparatus such as the PC 9 performs notification through a management information base (MIB) of a protocol simple network management protocol (SNMP) or a united protocol.

When the end processing is completed, the power supply unit 500 supplies power to the solenoid 311 via the power supply cable 309. Thereby, the solenoid 311 is driven to pull and turn off the seesaw switch 301. In the present exemplary embodiment, before the image forming apparatus 1 executes the end processing, the CPU 201 notifies the finisher controller 710 of the end processing via the printer controller 750. The end processing which the image forming apparatus 1 notifies to the finisher apparatus 700 is sent to the power supply unit 720 via the finisher controller 710. The power supply unit 720 which receives the notification supplies power to the solenoid 731 of the finisher apparatus 700. Thereby, the solenoid 731 is driven to pull and turn off the seesaw switch 730.

[Power Supply Unit 500]

Figure 6:
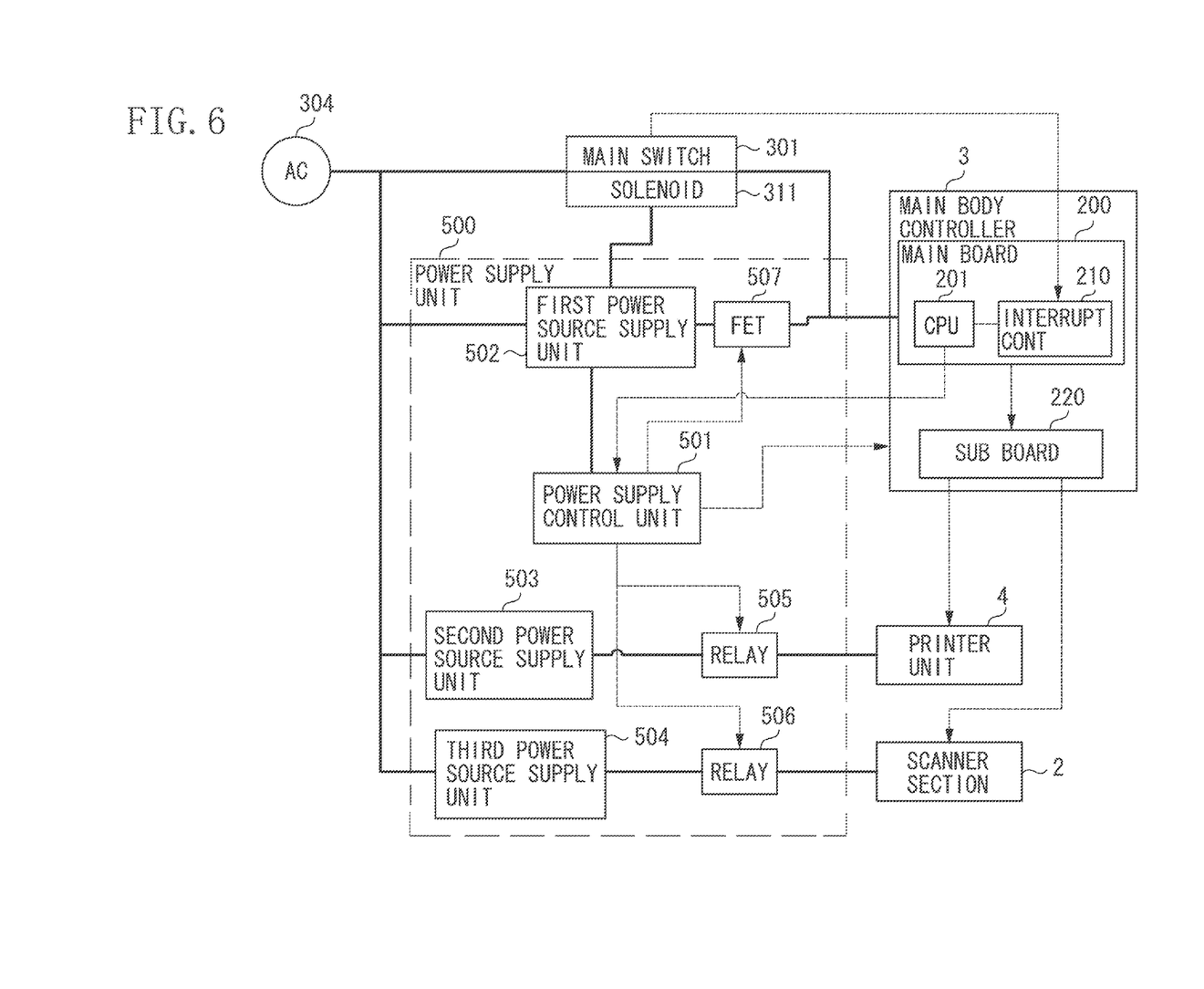
FIG. 6 is a block diagram illustrating a configuration of a power supply unit and the vicinity of the power supply unit of the image forming apparatus.

FIG. 6 is a block diagram illustrating a configuration of the power supply unit 500 and the vicinity of the power supply unit 500 of the image forming apparatus 1. The configuration of the power supply unit 500 and the vicinity thereof of the image forming apparatus 1 is described below with reference to FIG. 6.

The image forming apparatus 1 is connected to the AC power supply 304 and the seesaw switch 301 is connected between the AC power supply 304 and the main body controller 3. The AC power supply 304 is connected to the power supply unit 500. The AC power supply 304 is connected to the main body controller 3, the printer unit 4, and the scanner unit 2 via the power supply unit 500. The power supply unit 500 includes a power supply control unit 501, a first power source supply unit 502, a second power source supply unit 503, a third power source supply unit 504, relays 505 and 506, and a field effect transistor (FET) 507. The first power source supply unit 502 provided between the AC power supply 304 and the main body controller 3 converts the AC power supplied by the AC power supply 304 into the DC power and supplies the DC power to the main body controller 3. An FET 507 is provided between the first power source supply unit 502 and the main body controller 3. Turning on and off of the FET 507 is controlled by the above power supply control unit 501. The second power source supply unit 503 and the relay 505 are provided between the AC power supply 304 and the printer unit 4. The third power source supply unit 504 and the relay 506 are provided between the AC power supply 304 and the scanner unit 2. The second power source supply unit 503 converts the AC power supplied by the AC power supply 304 into the DC power supply and supplies the DC power to the printer unit 4. The third power source supply unit 504 converts the AC power supplied by the AC power supply 304 into the DC power supply and supplies the DC power to the scanner unit 2. The power supply control unit 501 performs various power controls of devices around the power supply unit 500. Turning on and off of the relays 505 and 506 is controlled by the above power supply control unit 501. The power supply control unit 501 turns on the relay 505 to supply power to the printer unit 4 only when using the printer unit 4. Otherwise, the power supply control unit 501 turns off the relay 505 to stop the supply of power to the printer unit 4. The power supply control unit 501 turns on the relay 506 to supply power to the scanner unit 2 only when using the scanner unit 2. Otherwise, the power supply control unit 501 turns off the relay 506 to stop the supply of power to the scanner unit 2. The power supply control unit 501 causes the first power source supply unit 502 to supply power to the solenoid 311 of the seesaw switch 301. This causes the solenoid 311 to pull the seesaw switch 301 to turn off the seesaw switch 301. The power supply control unit 501 controls switches (not illustrated) of the main body controller 3 to control the power state of the main body controller 3. Specifically, when a certain period of time elapses in the IDLE state, the power supply control unit 501 controls the switches (not illustrated) so that the power state of the main body controller 3 is brought into the state illustrated in FIG. 3.

[Power Control of Image Forming System]

Figure 7:
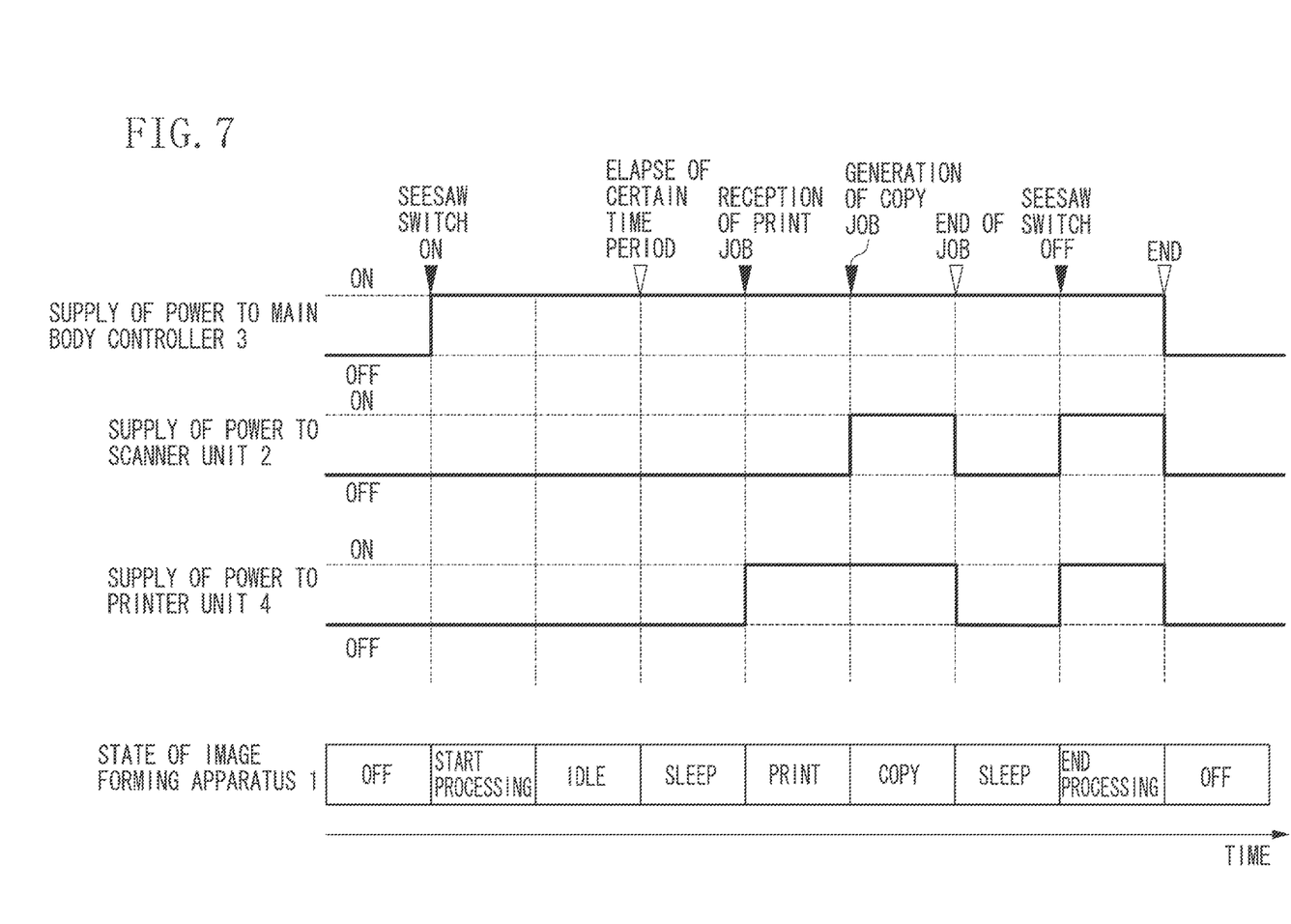
FIG. 7 illustrates the power state of the main body controller, a scanner unit, and a printer unit in each state of the image forming apparatus.

FIG. 7 illustrates the power state of the main body controller 3, the scanner unit 2, and the printer unit 4 in each state of the image forming apparatus 1. In FIG. 7, the abscissa indicates time. Characters in block in FIG. 7 correspond to states (1) to (9) described below, respectively. The power control of the image forming apparatus 1 is described below with reference to FIG. 7.

(1) State of the Image Forming Apparatus 1: Off State

When the image forming apparatus 1 is in an off-state, the power of the main body controller 3, the scanner unit 2, and the printer unit 4 is shut off.

(2) State of the Image Forming Apparatus 1: Start Processing

When the seesaw switch 301 of the image forming apparatus 1 is turned on by a user's operation, the image forming apparatus 1 is started. The start processing of the main body controller 3 is described below. When the state of the seesaw switch 301 is detected by the interrupt controller 210, the interrupt controller 210 notifies the power supply 500 that the seesaw switch 301 is brought into an on-state via the GPIO of the CPU 201. The power supply 500 supplies power to the main body controller 3. The CPU 201 supplied with power initializes hardware devices. The initialization of the hardware devices refers to register initialization, interrupt initialization, registration of a device driver in starting a kernel, and initialization of the operation unit 5. Next, the CPU 201 initializes software. The initialization of the software refers to call of initialization routine of each library, start of a process and a thread, start of software service for communication with the printer unit 4 and the scanner unit 2, and rendering of the operation unit 5. In the process of the start processing, the printer 4 and the scanner unit 2 are temporarily supplied with power. When the above initialization is completed, the image forming apparatus 1 is brought into the IDLE state.

The main body controller 3 establishes the configuration of the finisher apparatus 700 in the start processing. More specifically, the main body controller 3 negotiates with the finisher apparatus 700 via the printer unit 4 temporarily supplied with power in the start processing to establishes the device configuration of the finisher apparatus 700.

(3) State of the Image Forming Apparatus 1: IDLE State

When the start processing is completed, the image forming apparatus 1 is brought into the IDLE state. In the IDLE state, the supply of power to the printer 4 and the scanner unit 2 is stopped, but the main body controller 3 is supplied with power (refer to FIG. 2).

(4) State of the Image Forming Apparatus 1: Sleep State

When a certain period of time elapses while the image forming apparatus 1 is in the IDLE state, the image forming apparatus 1 is brought into the sleep state. When a certain period of time elapses while the image forming apparatus 1 is in the IDLE state, the CPU 201 notifies the power supply unit 500 that the image forming apparatus is brought into the sleep state. The notified power supply unit 500 stops supplying power to a part of the main body controller 3 and changes the power state of the main body controller 3 from that of FIG. 2 to FIG. 3.

(5) State of the Image Forming Apparatus 1: Print State

A return processing in which the image forming apparatus 1 returns from the sleep state is described below. When the CPU 201 receives while in the sleep state a print job of the PDL which is a factor for returning from the sleep state, via the network, the CPU 201 notifies the power supply unit 500 of the reception of the print job. The notified power supply unit 500 supplies power to the main body controller 3 and the printer unit 4 via the power supply cables 306 and 305 respectively. The printer unit 4 supplied with power executes the print job received via the network.

(6) State of the Image Forming Apparatus 1: Copy State

A case is considered where a copy job is generated by the user's operation of the operation unit 5 during the execution of the print job. When the copy job is generated, the CPU 201 notifies the power supply unit 500 that the copy job is generated. The notified power supply unit 500 supplies power to the main body controller 3, the printer unit 4, and the scanner unit 2 via the power supply cables 306, 305, and 310 respectively. The scanner unit 2 supplied with power reads the set document and generates image data and the printer unit 4 prints an image on paper based on the image data.

(7) State of the Image Forming Apparatus 1: Sleep State

When a certain period of time elapses after the execution of the copy job, the image forming apparatus 1 is brought into the sleep state. When the image forming apparatus 1 is brought into the sleep state, the CPU 201 notifies the power supply unit 500 that the image forming apparatus 1 is brought into the sleep state. The notified power supply unit 500 stops supplying power to a part of the main body controller 3 and changes the power state of the main body controller 3 from that of FIG. 2 to FIG. 3.

(8) State of the Image Forming Apparatus 1: End Processing (First Shift Processing)

When a predetermined period of time elapses while the image forming apparatus 1 is in the sleep state, the image forming apparatus 1 shifts from the sleep state to the off-state. At this stage, the image forming apparatus 1 executes the end processing. The end processing is described below.

(9) State of the Image Forming Apparatus 1: Off-State

When the end process is executed, the image forming apparatus 1 is brought into the off-state. In the off-state, the power supply unit 500 stops supplying power to the printer unit 4, the scanner unit 2, and the main body controller 3.

[End Processing of Image Forming Apparatus]

Figure 8:
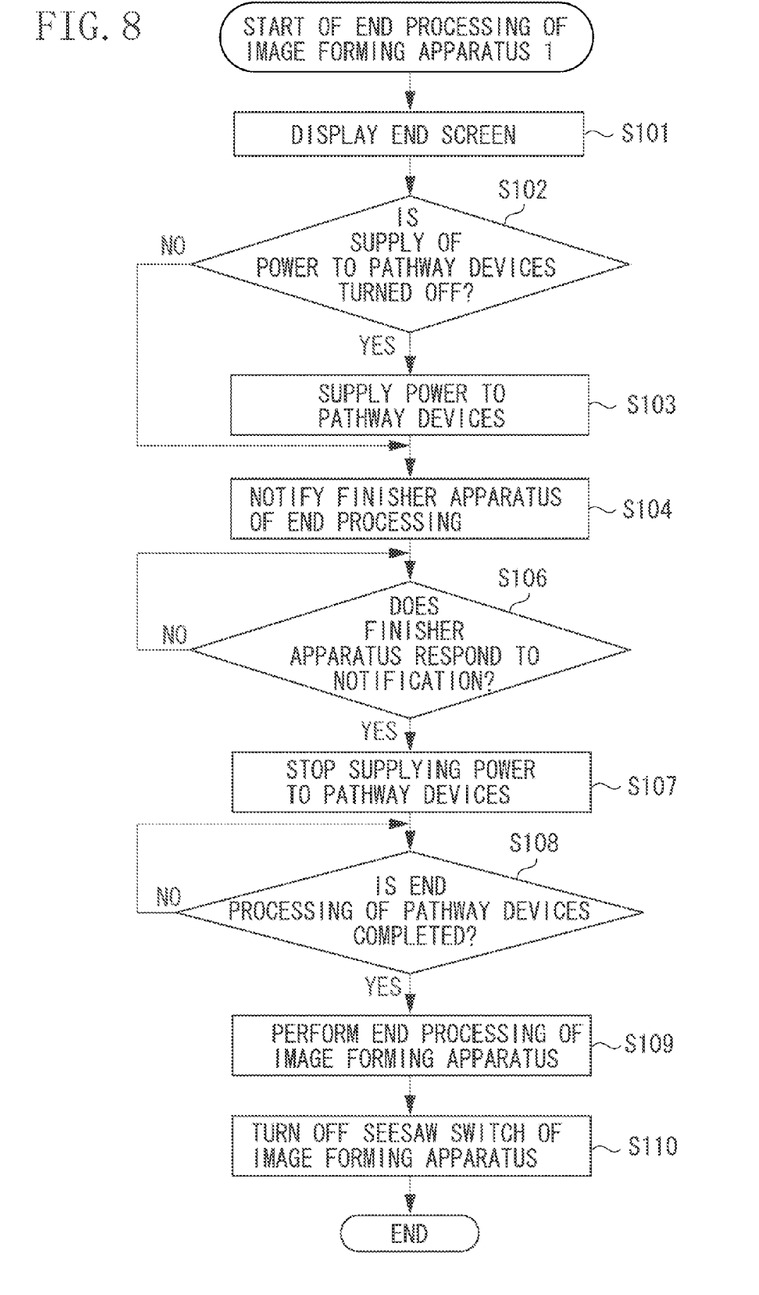
FIG. 8 is a flow chart of the end processing executed by the image forming apparatus.

FIG. 8 is a flow chart of the end processing (first shift processing) executed by the image forming apparatus 1. The above end processing (8) is described above with reference to FIG. 7.

In the sleep state before the end process is performed, as illustrated in FIG. 3, the supply of power to the printer unit 4 is being stopped, so that the image forming apparatus 1 cannot notify the finisher apparatus 700 of the execution of the end processing. Therefore, in the image forming apparatus 1 according to the present exemplary embodiment, the printer unit 4 is temporarily supplied with power so that the image forming apparatus 1 can notify the finisher apparatus 700 of the execution of the end processing. The following describes the end process in detail.

The flow chart illustrated in FIG. 8 is executed by the CPU 201 not only in the case where the shutdown function is executed but also in the case where the seesaw switch 301 is turned off by the user's operation. If a predetermined period of time elapses while the sleep state is kept unchanged, the following processing is executed. However, in the sleep state, the supply of power to the CPU 201 is being stopped. For this reason, in the present exemplary embodiment, power is supplied from the first power source supply unit 502 to the CPU 201 before the following processing is executed. The CPU 201 supplied with power executes the following processing.

In step S101, the operation unit 5 is controlled so that the CPU 201 causes the screen of the operation unit 5 to display information indicating that the end processing of the image forming system. 100 has been executed. The display is not requisite in the case of the end processing executed by the weekly shutdown function or by the auto shutdown function differently from the end processing executed by the operation of the seesaw switch 301 or by the remote shutdown function. This is because the image forming system 100 executes the end processing from the sleep state in which the screen of the operation unit 5 is not displayed.

In step S102, the CPU 201 confirms whether power is supplied to pathway devices from the CPU 201 to the finisher apparatus 700. If the CPU 201 determines that the power supplies of the pathway devices are in the off-state (YES in step S102), in step S103, the CPU 201 instructs the power supply unit 500 to turn on the power supplies of the pathway devices via the signal line 308. The pathway devices are chips of the printer unit 4 (the printer controller 750), the sub-board 220 (the device controller 228, the image processor 227, the CPU 221, and the bus controller 224), and the bus controller 204 of the main board 200.

In the present exemplary embodiment, the supply of power to the print unit 4 is stopped when the print function is not used. If the print function is not used, the CPU 201 instructs the power supply unit 500 to supply power to the print unit 4 via the signal line 308. To flexibly control the power of the sub-board 220, if the supply of power to the printer unit 4 and the sub-board 220 as the pathway devices is stopped, the CPU 201 instructs the power supply unit 500 to supply power to the printer unit 4 and the sub-board 220 via the signal line 308. If the supply of power to the bus controller 204 is stopped along with the stop of power supply to the sub-board 220, the CPU 201 instructs the power supply unit 500 to supply power to the printer unit 4, the sub-board 220, and the bus controller 204 via the signal line 308.

The pathway devices is different for each apparatus. In other words, devices different from the above pathway devices can be pathway devices. In the present exemplary embodiment, as examples of the pathway devices between the CPU 201 and the finisher apparatus 500, the printer unit 4, the sub-board 220 (the device controller 228, the image processor 227, the CPU 221, and the bus controller 224), and the bus controller 204 are provided. However, the pathway devices of the present invention are not limited to the above pathway devices. If a different finisher apparatus is connected between the finisher apparatus 500 and the image forming apparatus 1, the different finisher apparatus can be a pathway device.

In step S103, the pathway devices are supplied with power. In step S104, the CPU 201 notifies the finisher controller 710 of the finisher apparatus 700 of the end processing via the pathway devices supplied with power. More specifically, the CPU 201 notifies the finisher controller 710 of the end processing via the bus controller 204 of the main board 200, the bus controller 224 of the sub-board 220, the CPU 221 of the sub-board 220, the image processing processor 227, the device controller 228, and the printer controller 750 of the printer unit 4. The finisher controller 710 can perform the end processing of the finisher apparatus 700 according to the reception of the end processing.

In step S106, the CPU 201 determines whether a response to the notification of the end processing has been received from the finisher apparatus 700. If the CPU 201 determines that the response has been received (YES in step S106), in step S107, the CPU 201 instructs the power supply unit 500 to stop supplying power to the pathway devices via the signal line 308. The instructed power supply unit 500 stops supplying power to the pathway devices. In step S108, the CPU 201 confirms whether the end processing of the pathway devices is completed. The CPU 201 does not always need to stop supplying power to the pathway devices (in step S107) and confirm whether the end processing of the pathway devices is completed (in step S108) before the end processing of the image forming apparatus 1 is performed (in step S109 described below). The CPU 201 may stop supplying power to the pathway devices (in step S107) and confirm whether the end processing of the pathway devices is completed (in step S108) at the same timing that the end processing of the image forming apparatus 1 is performed (in step S109 described below) or that the seesaw switch 301 is turned off (in step S110 described below).

In step S109, the image forming apparatus 1 executes the end processing. The image forming apparatus 1 performs several end processing steps. Specifically, the CPU 201 performs the end processing of the process for controlling the image forming apparatus 1 and software applications. The CPU 201 performs processing for syncing a storage buffer cached on the memory 203 with a storage such as the hard disk 6 or the flash disk 207. Furthermore, the CPU 201 performs processing for shutting down the OS. The CPU 201 executing the end processing instructs the power supply unit 500 to supply power to the solenoid 311 of the seesaw switch 301. Thereby, in step S110, the power supply unit 500 supplies power to the solenoid 311 to turn off the seesaw switch 301. Finally, the power supply control unit 501 turns off the FET 507 to stop supplying power to the main body controller 3, turning off the image forming apparatus 1.

In the present exemplary embodiment, the end processing is executed by the auto shutdown function, the weekly shutdown function, and the remote shutdown function to turn off the seesaw switch 301. As a result, the image forming apparatus 1 is brought into the off-state (the power saving state). In the present exemplary embodiment, however, the power saving state of the present invention may be a suspension state or a hibernation state as well as the above off-state. The suspension state refers to the one that power is supplied to the GPIO (complex programmable logic device (CPLD)) managed by the CPU 201 and a part of memory 203 even if the seesaw switch 301 is in the off-state and is one of methods for increasing the speed of the next start. The GPIO (CPLD) is used as a flag for discriminating a specific off-state at the next start. The hibernation state refers to the state where the seesaw switch 301 is in the off-state and which can be returned to the state assumed just before the power of the image forming system 100 is shut off. The state before the power of the image forming system 100 is shut off is stored in the hard disk 6. The image forming system. 100 is brought into the state immediately before the power supply is shut off based on the state stored in the hard disk 6 when the seesaw switch 301 is brought into the on-state.

[End Processing of Finisher Apparatus]

Figure 9:
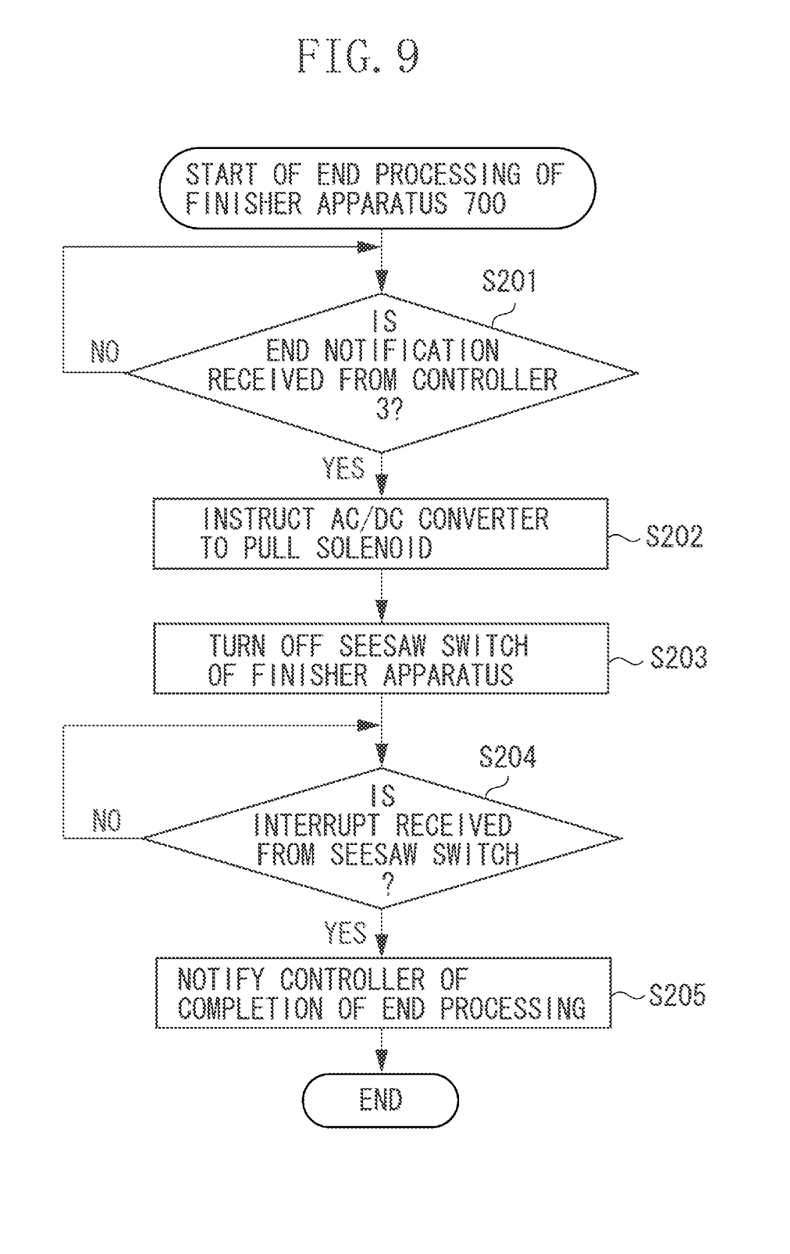
FIG. 9 is a flowchart for the end processing executed by the finisher apparatus.

FIG. 9 is a flow chart for the end processing (a second shift processing) executed by the finisher apparatus 700. The end processing executed by the finisher apparatus 700 is described in detail below with reference to FIG. 9.

In step S201, the finisher controller 710 determines whether an end notification (a shift notification) has been received from the main body controller 3 of the image forming apparatus 1. The end notification is sent from the CPU 201 of the image forming apparatus 1 to the finisher controller 710 of the finisher apparatus 700 in step S104 described above. If the finisher controller 710 determines that the end notification has been received from the main body controller 3 (YES in step S201), in step S202, the finisher controller 710 instructs the power supply unit 720 to supply power to the solenoid 731 of the seesaw switch 730. Thereby, in step S203, the solenoid 731 is driven to turn off the seesaw switch 730. In step S204, the finisher controller 710 determines whether an interrupt has been received from the seesaw switch 730. The interrupt is issued when the seesaw switch 730 is brought into the off-state. If the finisher controller 710 receives the interrupt (YES in step S204), in step S205, the finisher controller 710 transmits a response to the end processing to the main board 200 via the printer controller 750 and the sub-board 220.

As illustrated in FIG. 4, even if the seesaw switch 730 is brought into the off-state, the finisher apparatus 700 according to the present exemplary embodiment does not instantly stop supplying power to the finisher controller 710. This is because power is supplied from the power supply unit 720 thereto even if the seesaw switch 730 is brought into the off-state. Therefore, the finisher controller 710 can send back a response to the end notification, to the image forming apparatus 1. On the other hand, when the seesaw switch 730 of the finisher apparatus 700 is brought into the off-state, the supply of power to each unit in the finisher apparatus 700 is sometimes stopped. In this case, the supply of power to the finisher controller 710 is also stopped, so that the finisher controller 710 cannot send back a response to the end notification, to the image forming apparatus 1. Accordingly, in the system in which the supply of power to each unit in the finisher apparatus 700 is stopped, the finisher controller 710 may send back a response to the end notification, to the CPU 201 in a period immediately after the end notification is received until the seesaw switch 730 is brought into the off-state.

[Effect of Present Exemplary Embodiment]

In the present exemplary embodiment, when the end processing of the image forming system 100 is performed, power is supplied to the pathway devices between the CPU 201 of the image forming apparatus 1 and the finisher apparatus 700 to allow the CPU 201 to notify the finisher apparatus 700 of the end processing. Thereby, the finisher apparatus 700 can execute the end processing.

[Modification]

In the present exemplary embodiment, as an example, the mechanical seesaw switch 301 is used that maintains the on and off-states according to the user's operation, however, a switch according to the present invention is not limited to the mechanical seesaw switch 301. For example, a tact switch which does not maintain the on and off-states may be used instead of the seesaw switch 301. If the tact switch is used, the image forming apparatus 1 operates in the following patterns. However, the following patterns are only an example.

1. In the state where the power supply of the image forming apparatus 1 is turned on, the tact switch is pressed to bring the image forming apparatus 1 into the off-state or the sleep state.

2. In the state where the power supply of the image forming apparatus 1 is not turned on, the tact switch is pressed to bring the image forming apparatus 1 into the on-state.

3. In the state where the power supply of the image forming apparatus 1 is turned on, the tact switch is pressed to forcibly bring the image forming apparatus 1 into the off-state.

In the present exemplary embodiment, the control of power supply is described as power control of the printer unit 4 and the scanner unit 2, however, the present invention is not limited to the above exemplary embodiment. Instead, clock supply to the printer unit 4 and the scanner unit 2 may be controlled.

The example in which the flow chart in FIG. 8 is executed by one CPU is described above, but the flow chart may be distributed among a plurality of CPUs and executed.

If a plurality of the finisher apparatuses is connected, the printer unit 4 sends the end notification to a single finisher apparatus adjacent to the image forming apparatus 1. The printer unit 4 receives response to the end notification from all of the finisher apparatuses connected to the image forming apparatus 1 and then transmits a response to the end processing, to the main board 200.

If a response to the end notification cannot be received from the finisher apparatus 700, the main board 200 waits for the response from the printer unit 4 until a predetermined period of time elapses. The predetermined period of time is 50 seconds, for example. If there is no response from the finisher apparatus 700 for 50 seconds after the end notification is transmitted, the CPU 201 starts the end processing. If the software of the image forming apparatus 1 of the present invention hangs up, the power supply shutdown processing is executed after a predetermined period of time elapses.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-143140 filed Jun. 26, 2012, which is hereby incorporated by reference herein in its entirety.

What is claimed is:

1. An image forming apparatus to which a post-processing apparatus is connectable, the image forming apparatus comprising:
   a printer configured to form an image on a sheet;
   a controller configured to execute a first end processing for turning off the image forming apparatus;
   a printer controller configured to control an operation of the printer and to notify the post-processing apparatus of a specific instruction; and
   a power supply unit configured to supply power to the printer controller on a basis of a lapse of a predetermined time in a state in which a power supply to the printer controller is stopped,
   wherein the printer controller supplied with the power from the power supply unit notifies the post-processing apparatus of the specific instruction and then, the post-processing apparatus executes a second end processing for turning off the post-processing apparatus in accordance with the specific instruction notified from the printer controller and the controller executes the first end processing for turning off the image forming apparatus.

2. The image forming apparatus according to claim 1, wherein the printer outputs the sheet on which the image is formed to the post-processing apparatus.

3. The image forming apparatus according to claim 1, further comprising: an image processor configured to subject input image data to image processing and to transmit the image data subjected to the image processing to the printer controller,
wherein the power supply unit supplies power to the image processor and the printer controller on the basis of the lapse of the predetermined time in the state.

4. The image forming apparatus according to claim 1, wherein the controller is configured to determine whether the power supply to the printer controller is stopped.

5. The image forming apparatus according to claim 4, further comprising a memory configured to store a power state of the image forming apparatus, wherein the controller is configured to determine whether the power supply to the printer controller is stopped based on the power state of the image forming apparatus stored in the memory.

6. The image forming apparatus according to claim 1, wherein the printer controller is configured to receive a response to the specific instruction transmitted from the printer controller to the post-processing apparatus, and wherein the controller is configured to execute the first end processing in accordance with the response received by the printer controller.

7. The image forming apparatus according to claim 1, further comprising: a first power switch which can be switched between an on-state or an off-state by a user's operation,
   wherein the power supply unit supplies power to the printer controller on a basis of switching of the first power switch to the off-state in the state, and
   wherein the printer controller supplied with the power from the power supply unit notifies the post-processing apparatus of the specific instruction.

8. The image forming apparatus according to claim 7, wherein the first power switch is a toggle switch capable of maintaining the on-state and the off-state.

9. The image forming apparatus according to claim 1, further comprising:
   a first power switch which can be switched between an on-state and an off-state by a user's operation, and
   an actuator which switches the first power switch from the on-state to the off-state,
   wherein the controller controls the actuator to switch the first power switch from the on-state to the off-state after the printer controller supplied with the power from the power supply unit notifies the post-processing apparatus of the specific instruction.

10. The image forming apparatus according to claim 1, wherein, after the first end processing is executed, a power state of the image forming apparatus becomes any one of an off-state in which the supply of power to the image forming apparatus is shut off, a hibernation state, or a suspension state.

11. The image forming apparatus according to claim 1, wherein the image forming apparatus has a first plug, and the post-processing apparatus has a second plug different from the first plug.

12. The image forming apparatus according to claim 1, wherein the printer controller supplied with the power from the power supply unit notifies, under a control of the controller, the post-processing apparatus of the specific instruction.

13. A method for controlling an image forming apparatus to which a post-processing apparatus is connectable, the method comprising:
   forming, via a printer of the image forming apparatus, an image on a sheet;
   executing, via a controller of the image forming apparatus, a first end processing for turning off the image forming apparatus;

controlling, via a printer controller of the image forming apparatus, an operation of the printer;

notifying, via the printer controller, the post-processing apparatus of a specific instruction; and supplying, via a power supply unit of the image forming apparatus, power to the printer controller on a basis of a lapse of a predetermined time in a state in which a power supply to the printer controller is stopped, wherein the printer controller supplied with the power from the supplying step notifies the post-processing apparatus of the specific instruction and then, the post-processing apparatus executes a second end processing for turning off the post-processing apparatus in accordance with the specific instruction notified from the printer controller and the controller executes the first end processing for turning off the image forming apparatus.

14. An image forming system equipped with an image forming apparatus to which a post-processing apparatus is connectable and the post-processing apparatus configured to subject a sheet output from the image forming apparatus to post-processing, the image forming system comprising:

the image forming apparatus having:
a printer configured to form an image on a sheet;
a first controller configured to execute a first end processing for turning off the image forming apparatus;
a printer controller configured to control an operation of the printer and to notify the second controller of a specific instruction;
a power supply unit configured to supply power to the printer controller on a basis of a lapse of a predetermined time in a state in which a power supply to the printer controller is stopped, wherein the printer controller supplied with the power from the power supply unit notifies the post-processing apparatus of the specific instruction; and a second controller configured to execute a second end processing for turning off the post-processing apparatus in accordance with the specific instruction notified from the printer controller;

wherein the first controller executes the first end processing after the printer controller notified the second controller of the specific instruction.

15. The image forming system according to claim 14, wherein the printer outputs the sheet on which the image is formed to the post-processing apparatus.

16. The image forming system according to claim 14, wherein the second controller receives the specific instruction notified from the printer controller to the post-processing apparatus, and wherein the second controller executes the second end processing in accordance with the received specific instruction.

17. The image forming system according to claim 14, wherein the post-processing apparatus is configured to subject the sheet received from the image forming apparatus to discharging, sorting, stapling, punching, or cutting.

18. The image forming system according to claim 14, wherein the post-processing apparatus further has
a second power switch which can be switched between an on-state and an off-state by a user's operation, and
an actuator which switches the second power switch from the on-state to the off-state,
wherein the second controller controls the actuator to switch the second power switch from the on-state to the off-state in accordance with the specific instruction notified from the printer controller.

* * * * *